United States Patent [19]
Nelson et al.

[11] Patent Number: 6,099,885
[45] Date of Patent: Aug. 8, 2000

[54] DOUBLE-SIDED RAVIOLI APPARATUS, METHOD AND PRODUCT

[75] Inventors: James S. Nelson, Cokato; Marcia H. Richter, Eagan, both of Minn.

[73] Assignee: Faribault Foods, Inc., Minneapolis, Minn.

[21] Appl. No.: 09/211,425

[22] Filed: Dec. 15, 1998

[51] Int. Cl.[7] ................................. A21C 9/00; A23P 1/00
[52] U.S. Cl. .................. 426/512; 99/450.2; 99/450.6; 99/450.7; 425/115; 425/237; 425/362; 426/283
[58] Field of Search ..................................... 426/512, 283, 426/285, 503; 99/450.2, 450.6, 450.7; 425/115, 237, 362, 408

[56] References Cited

U.S. PATENT DOCUMENTS 3,605,641  9/1971  Shuster ................................... 99/450.7
4,848,218  7/1989  Battaglia ................................ 99/450.2

*Primary Examiner*—George C. Yeung
*Attorney, Agent, or Firm*—Faegre & Benson LLP

[57] ABSTRACT

An improved apparatus and method for improving the integrity of seams of ravioli in commercial production. The improvement includes applying dry steam to the top surface of the bottom layer of pasta dough and to the bottom surface of the top layer of pasta dough before sealing the seams together. Steam is applied via a pair of steam manifolds adjacent the pasta layers and increases the adhesiveness of the pasta. In another aspect, stresses in the layers of pasta dough are relieved by forming the individual pockets into convex shapes, reducing the stresses in the upper pasta dough layer.

8 Claims, 3 Drawing Sheets

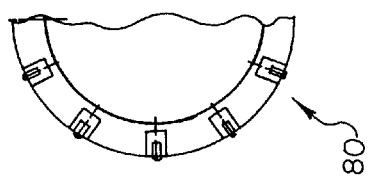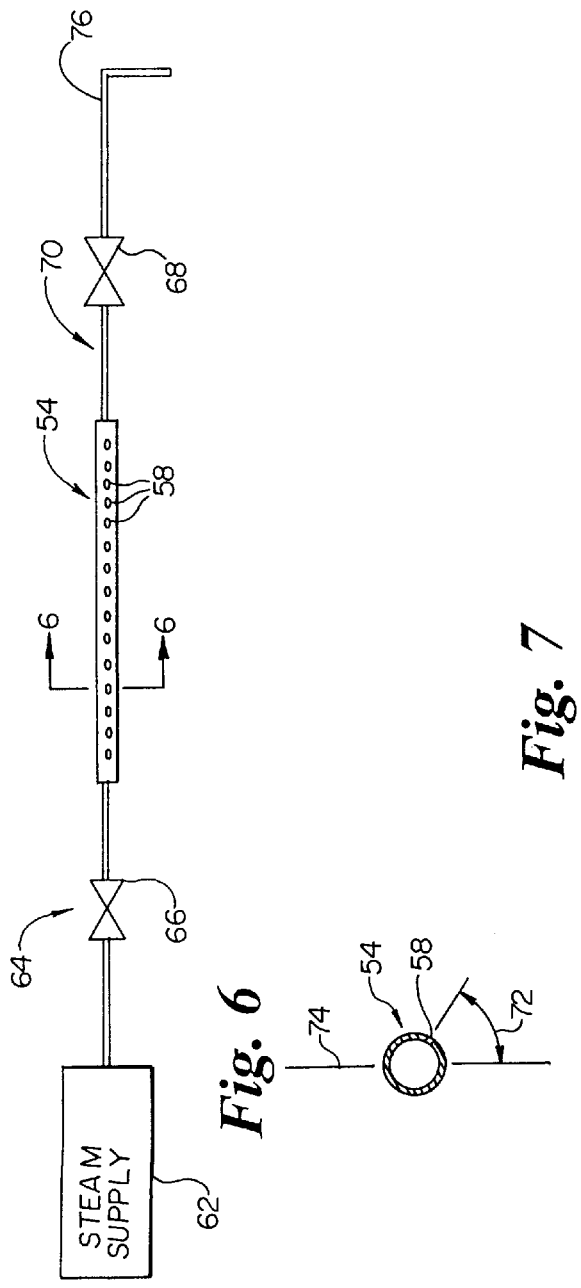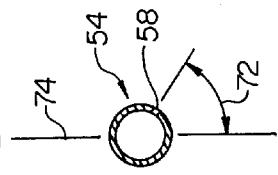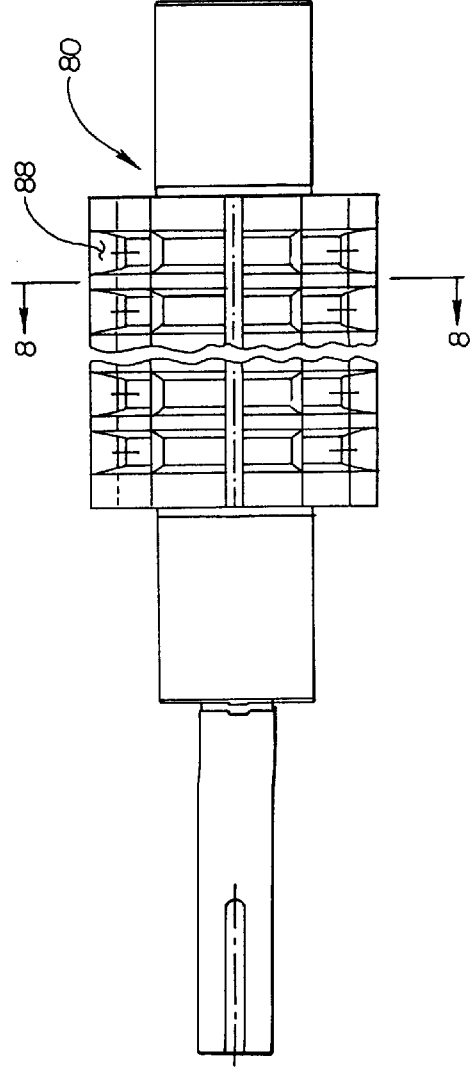

DOUBLE-SIDED RAVIOLI APPARATUS, METHOD AND PRODUCT

BACKGROUND OF THE INVENTION

In the past, commercial production of ravioli has been made using process equipment which includes a pair of pasta dough sheet delivery subsystems, each of which typically has a hopper supplying dough to a kneading roller, a first forming roller and a finishing roller before delivery of the pasta dough to a ravioli assembly conveyor line. The ravioli assembly conveyor line receives a first or lower dough sheet to which a filling delivery manifold provides portions of ravioli filling, after which the second dough sheet delivery system applies the second or upper dough sheet. The pasta-filling-pasta laminate is then typically processed by a die roller and slitter roll to form and seal the ravioli into individual pillows or cases of dough with a savory filling such as meat or cheese contained therein. Commercial production of ravioli has been limited because of the difficulty in ensuring integrity of the pasta dough seams surrounding the filling. Exacerbating this problem has been the unequal elastic stresses induced in the pillow structure with one sided ravioli pillows, wherein the top pasta layer is required to stretch over and surround the filling, while the bottom pasta layer is typically not stressed. The consequence has been that any "elastic" memory in the top pasta layer will tend to draw the top pasta layer away from the bottom pasta layer, stressing the seams, and sometimes causing seam failures, degrading the integrity of the pasta pillows forming the ravioli and impairing the aesthetic appearance thereof. The present invention overcomes this shortcoming of the prior art. While shown and described with respect to traditional ravioli, the present invention is useful for any application involving filled pasta pockets, whether using traditional fillings such as are used for ravioli or any other filling desired to be retained in a pasta pocket.

BRIEF DESCRIPTION OF THE DRAWINGS

FIG. 5 is a simplified schematic view of a steam manifold useful in the practice of the present invention.

FIG. 6 is a cross sectional view of the steam manifold of FIG. 5 taken along line 6—6.

FIG. 7 is a side elevation view of an upper pasta pillow forming roll.

FIG. 8 is a fragmentary section view of the roll of FIG. 7 taken along line 8—8.

DETAILED DESCRIPTION OF THE INVENTION

Figure 1:
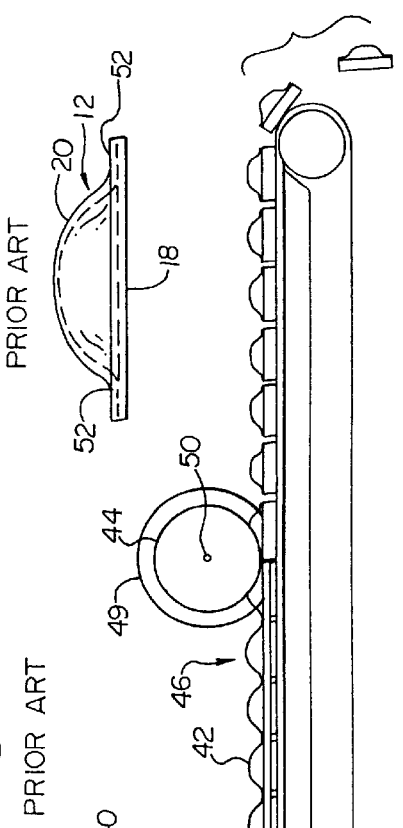
FIG. 1 is a simplified side view of a prior art ravioli manufacturing machine.
Figure 2:
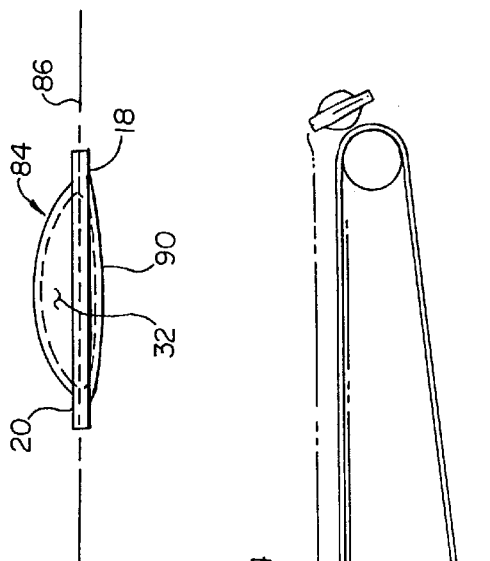
FIG. 2 is a side view of a prior art ravioli manufactured by the machine of FIG. 1.

Referring now to the Figures, and particularly, to FIGS. 1 and 2, a prior art apparatus 10 for making prior art pasta pillows 12 may be seen. Apparatus 10 includes hoppers 14, 16, each for delivering a ribbon or sheet of pasta 18, 20, respectively, for the bottom and top layers of the pillow 12. Such prior art apparatus also typically included a pair of kneading rollers 22 for each of ribbons 18, 20, and a pair of forming rollers 24 and a pair of finishing rollers 26. It is to be understood that the forming rollers 24 are typically smooth and used to initially form the ribbons 18 and 20 to near final thickness, with the finishing rollers 26 bringing each of ribbons 18 and 20, respectively, to their desired final thicknesses.

A filling manifold 30 preferably delivers either a continuous ribbon or a succession of discrete servings of filling 32 to the top surface 34 of the bottom layer or ribbon 18.

The top layer 20 of pasta is then delivered on top of the filling and bottom layer such that the bottom surface 36 of the top layer 20 contacts the filling and bottom layer 18 of pasta. The pasta-filling-pasta laminate 18, 32, 20 is then transported via a conveyor 38 to a die roller 40 which shapes the individual "pockets" 42 of filled pasta, compressing the upper layer 20 against the lower layer 18 in the regions of the pasta layers peripheral to the filling servings 32. At this time, the pockets 42 are individually formed and severed into transversely connected rows by transverse cutter blades 48 on the forming roll 40. The transversely connected pockets in laminate 46 made up of layers 18, 32 and 20 are then separated into individual ravioli by a slitter roll 44 having circumferential blades 49 extending around the periphery of slitter roll 44 which rotates about axis 50.

Once the individual pillows are formed and severed, they are delivered to further processing machinery (not shown) for cooking and packaging.

As has been mentioned, such prior art apparatus relies on the elasticity of only the top layer 20 to properly form the individual pillows of pasta. This imposes a strain on the seam between the top layer 20 and the bottom layer 18 because all of the stretching of the pasta required to surround the filling is in the top layer 20 of pasta. Furthermore, both pasta layers 18 and 20 must be sufficiently "tacky" to adhere to each other in the regions where the bottom surface 36 of the top layer 20 contacts the top surface 34 of the bottom layer 18 in the peripheral regions 52 of each pillow 12. In the past, efforts to improve the tackiness of the pasta included water misting. This approach was deficient in that the demands of modern automated ravioli production call for relatively high throughput rates (on the order of 3600 filled pasta pockets or "pillows" per minute) with consistently good sealing of the seams between the layers of pasta in the regions surrounding the filling. A balance must be struck in the moisture content of the dough, because pasta dough that is too wet will stick to the kneading, forming and finishing rolls; and dough that is too dry will not seal properly and consistently. As used herein, "tacky" and "tackiness" refer to the degree of adhesion of the pasta layers to each other. The pasta dough is considered sufficiently tacky when separation of the layers results in at least partial tearing of the dough from one layer to the other when a seam is intentionally separated after the pasta dough layers are lightly compressed together, for example, by the forming rolls.

Referring now to FIGS. 3, 4 and 7 through 10, one advantage of the present system is to relieve the stress on the upper pasta layer 20 inherent in the prior art structure of FIG. 2, created when the pasta pillow 12 is formed by the prior art apparatus 10. In the operation of the present system, this stress is relieved by providing a pair of pillow forming rolls 80, 82 which form improved individual pasta pillows 84 having the appearance of a conventional asymmetrical ravioli structure (i.e., having a convex projection only on the top pasta layer), but which actually have a slight depression in the lower pasta layer to relieve the severity of the stress that occurs in the upper pasta layer when it is stretched to encompass the filling. It is to be understood that a generally symmetrical shape about a central plane 86 would be more desirable from a structural integrity standpoint, but it believed that there would be a resistance by consumers to such a symmetrical ravioli. The present system obtains some advantage of the symmetrical structure, while retaining the consumer appeal of the more traditional single sided ravioli. This result is obtained by having the lower pillow forming roll 82 formed with less depth to the recesses 89 therein than the recesses 88 of the upper pillow forming roll 80. Ravioli made with such rolls is thus able to form the lower and upper pasta layers 18 and 20 into an asymmetrical convex shape 90 around the filling 32, reducing the stresses on the upper pasta layer 20, while closely imitating the appearance of traditional asymmetrical or single convex sided ravioli.

Upper pillow forming roll 80 preferably has transverse cutters 81 to sever rows of pasta pillows as they are formed. A slitter roll 92 is located downstream to sever the individual pasta pillows in each row. Slitter roll has a plurality of circumferential knives 93, each of which preferably acts against an anvil roll 94. In one embodiment, anvil roll 94 has recesses 96 to avoid deforming the lower convex shape or projection 90 of the individual filled pasta pillows 84. In another embodiment, it has been found that anvil roll 94 may be a simple cylindrical roll without recesses 96.

Figure 3:
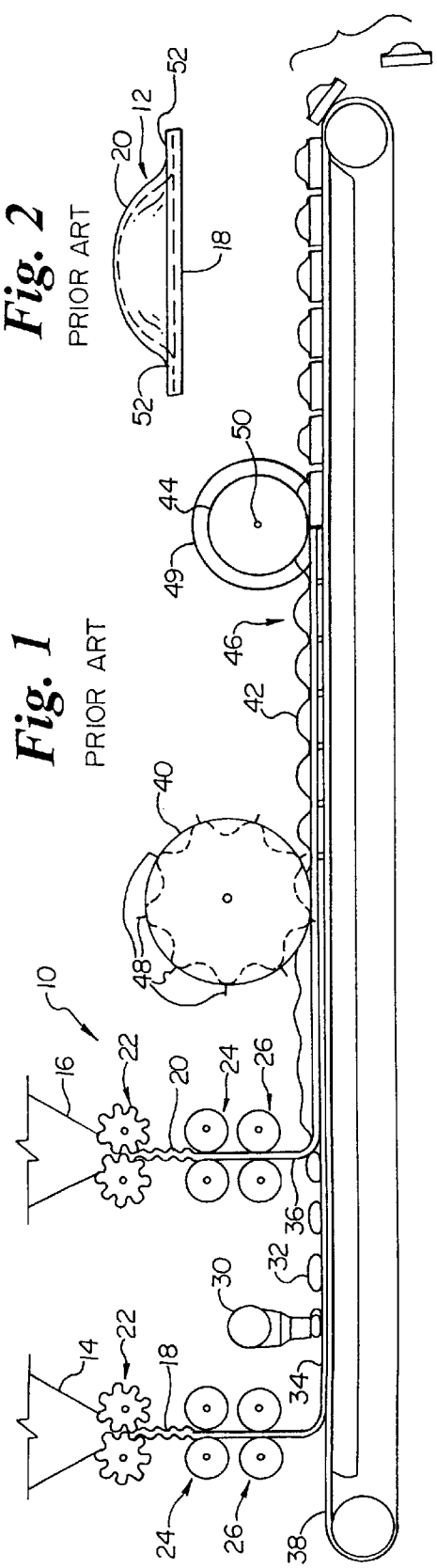
FIG. 3 is a simplified side view of a ravioli machine of the present invention.
Figure 4:
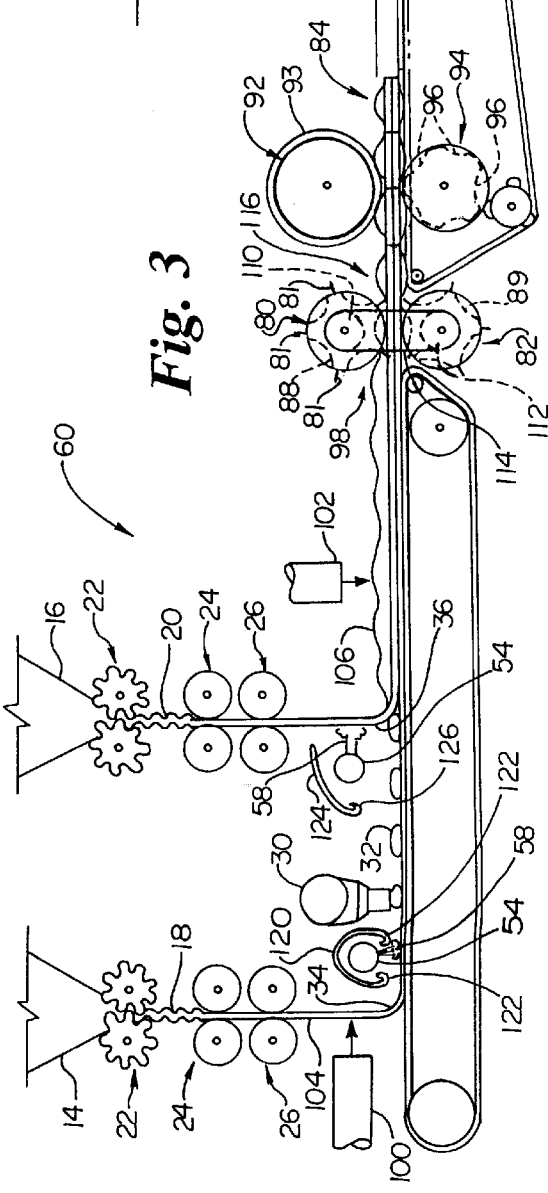
FIG. 4 is a side view of an improved ravioli.
Figure 9:
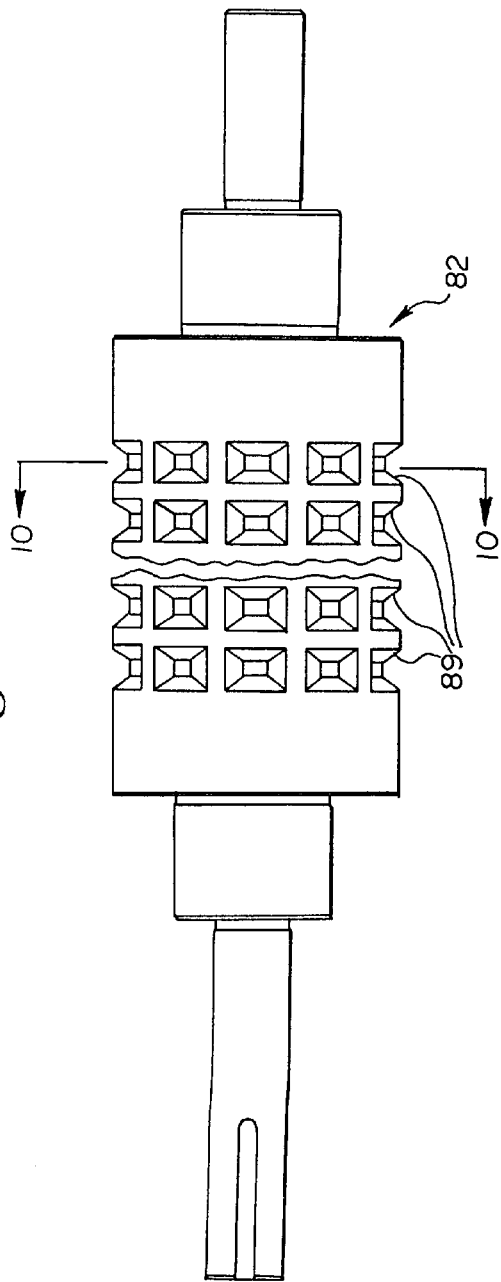
FIG. 9 is a side elevation view of a lower pasta pillow forming roll.
Figure 10:
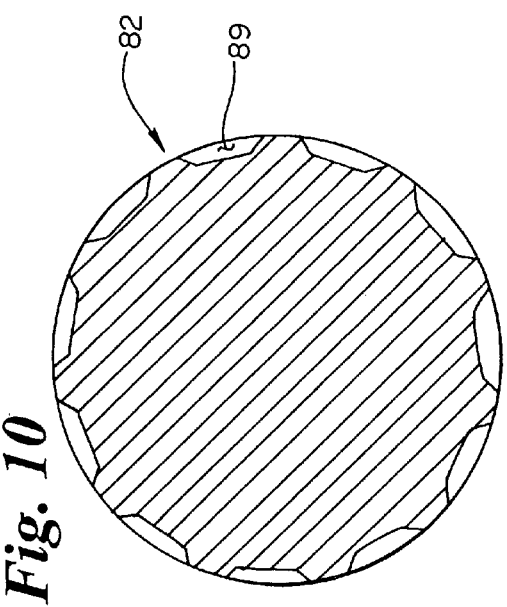
FIG. 10 is a section view of the roll of FIG. 9 taken along line 10—10.

Preferably, rolls 80 and 82 have synchronizing means 98, shown in FIG. 3 in a simplified form of a pair of hubs or sprockets 110, 112 and a belt or chain 114. If an arrangement of hubs and belts is used, it is preferable that they be of the type having teeth or cogs to ensure registration or synchronization of the rolls to maintain the alignment of the recesses 88 in the rolls 80 and 82 such that the recesses will always face each other in the nip or gap 116 between rolls 80 and 82. If recesses 96 are provided in anvil roll 94, a similar arrangement of a synchronizing means (not shown) is to be preferably provided for roll 94 to maintain registration of the recesses of that roll with the pair of rolls 80 and 82, to ensure registration with the individual pasta pockets formed and sealed by rolls 80 and 82. When a simple cylindrical outer surface (without recesses) is used for anvil roll 94, no synchronizing is required. It has been found that using a cylindrical (non-recessed) anvil roll 94 results in satisfactory operation without significantly deforming the lower convex projection 90 of the pasta pillow 84.

In another aspect, the improved method of making filled pasta pillows includes applying moisture in the form of "dry" steam downstream of the kneading, forming and finishing rolls. In the preferred practice, steam is applied to the top surface 34 of the bottom layer 18 and the bottom surface 36 of the top layer 20, although it is to be understood that some of the benefits may be obtained by applying the steam to only one surface. Referring to FIG. 3 showing an improved ravioli forming apparatus 60, steam is applied via steam manifolds 54. Referring now also to FIGS. 5 and 6, each manifold 54 is preferably formed of ¼" diameter schedule 40 stainless steel pipe 56 having 1/16" diameter steam delivery holes 58 spaced on ¾" centers along the pipe, with a sufficient number of such delivery holes to cover the width of the pasta sheets 18, 20. A 90 psi supply 62 of high enthalpy steam is provided at the upstream end 64 of each manifold, with a manually operable throttle valve 66 between the steam supply 62 and the manifold 54. A bleed valve 68 is preferably located downstream of the downstream end 70 of manifold 54 to bleed steam and condensation to atmosphere as necessary to reduce or eliminate accumulation of condensation within the manifold 54. Furthermore, as may be seen most clearly in FIGS. 5 and 6, the steam delivery holes 58 are preferably oriented at an angle 72 of 45 degrees or more from the vertical axis 74 to allow any condensation forming in the interior of the manifold 54 to be bled off via valve 68 and conduit 76 which preferably discharges away from the sheets of pasta being treated by the steam from manifold 54. To that end, it is preferable that the downstream end 70 of steam manifold 54 be positioned vertically lower than the upstream end 64, to promote transport of liquid condensate in the steam manifold 54 to be directed towards the downstream end 70 and drain conduit 76 by gravity drainage.

Referring now again to FIG. 3, the seam sealer apparatus preferably also includes a steam containment hood 120 generally surrounding steam manifold 54 to contain the steam exiting the outlet 58. The containment hood 120 directs the steam to the opposed surface 34 of the pasta dough sheet or layer 18 adjacent the steam manifold 54. Hood 120 also includes at least one, and preferably two curled edges 122 to capture and direct any condensation forming on the hood. Edges 122 are preferably angled or tilted to direct condensate collected therein to be discharged away from the pasta dough sheets and adjacent the machine or apparatus 10. Similarly, the steam manifold 54 located between the pair of dough sheet feeders also has a steam containment hood 124 having at least one curled edge 126. Hood 124 contains the steam exiting the outlet 58 and directs the steam to the opposed surface 36 of the adjacent pasta dough sheet 20. Edge 126 captures and directs any condensation forming on the hood 124 to be discharged away from the pasta dough sheets 18 and 20.

Referring now most particularly to FIG. 3, hot air jets 100, 102 preferably deliver heated air to the underside 104 of the bottom layer of pasta 18 and to the top side 106 of the upper layer of pasta 20, to dry the surfaces of the pasta layers that contact the pillow forming rolls to reduce the propensity of the pasta to stick to the pillow forming rolls.

The invention is not to be taken as limited to all of the details thereof as modifications and variations thereof may be made without departing from the spirit or scope of the invention. For example, the present invention is not limited in the shape of the "footprint" or top plan view of the individual filled pasta pockets or pillows, nor is it limited by the type of filling used in the pillows.

What is claimed is:

1. Apparatus for forming filled pasta pockets from an upper layer of pasta and a lower layer of pasta with a filling therebetween, the apparatus comprising:

a) a first pillow forming roll, having a plurality of recesses for shaping the upper pasta layer into an upper convex shape;

b) a second pillow forming roll having a plurality of recesses for shaping the lower pasta layer into a lower convex shape having less convexity than the upper pasta layer wherein the first and second pillow forming rolls are positioned adjacent each other to form a nip therebetween; and c) means for synchronizing the first and second pillow forming rolls to provide that the recesses in the first pillow forming roll will oppose recesses in the second pillow forming roll at the nip to provide that the convex shapes on the pasta layers of the individual pockets of filled pasta will be opposite each other resulting in individual pockets of filled pasta having convex upper and lower pasta layers with the appearance of a pocket of filled pasta having only a convex upper layer.

2. The apparatus of claim 1 wherein the upper pillow forming roll further includes means for transversely severing rows of filled pasta pockets as the pockets are formed.

3. The apparatus of claim 2 wherein the upper pillow forming roll revolves around a cylindrical axis and the means for transversely severing rows includes a plurality of transverse knives located about the circumference of the upper pillow forming roll, with each transverse knife extending parallel to the cylindrical axis.

4. The apparatus of claim 1 further comprising:

d) a slitter roll downstream of the pillow forming rolls; and e) an anvil roll adjacent to the slitter roll, wherein the anvil roll has a plurality of recesses therein to preserve the convex shape on the lower pasta layer of the individual pockets of filled pasta as the slitter roll and anvil roll sever the individual pockets of filled pasta from each other.

5. The apparatus of claim 1 further comprising:

f) a slitter roll downstream of the pillow forming rolls; and g) an anvil roll adjacent to the slitter roll, wherein the anvil roll has a generally cylindrical outer surface, and wherein the pasta layers of the individual pockets of filled pasta are sufficiently resilient to preserve the convex shape on the lower pasta layer of the individual pockets of filled pasta as the slitter roll and anvil roll sever the individual pockets of filled pasta from each other.

6. A method of forming filled pasta pockets comprising the steps of:

a) inserting a filling material between a pair of sheets of pasta to form a laminate of filling surrounded by pasta layers;

b) moving the laminate of filling and pasta layers between a pair of pillow forming rolls, each having a plurality of recesses for shaping each layer of pasta into a shape having an upper convex projection and a lower convex projection with the convexity of the lower projection less than the convexity of the upper projection resulting in individual pockets of filled pasta having convex projections on opposite sides thereof and having the appearance of a pocket having a convex projection on only one side thereof.

7. The method of claim 6 comprising the additional step of:

g) severing the individual filled pockets of pasta from each other without deforming the convex shapes of the individual pillows.

8. In a filled pasta product of the type having a filling contained between a convex projecting upper pasta layer and a lower pasta layer, the improvement in combination therewith comprising a slight convex projection in the lower pasta layer such that stresses in the upper layer of pasta are reduced while maintaining the appearance of a product having a convex projection on only the upper pasta layer.

* * * * *